Fig. 2.

INVENTOR.
Thomas Lester May,
Lenyon & Lenyon
ATTORNEYS

July 3, 1951  T. L. MAY  2,559,195
CONTROL FOR PRESSES
Filed Dec. 11, 1945  10 Sheets-Sheet 4

INVENTOR.
Thomas Leetley May
BY
Kenyon & Kenyon
ATTORNEYS.

Fig. 11.

INVENTOR.
THOMAS LESTLER MAY
BY
Kenyon & Kenyon
ATTORNEYS

Patented July 3, 1951

2,559,195

UNITED STATES PATENT OFFICE 2,559,195

CONTROL FOR PRESSES

Thomas Lestler May, New York, N. Y., assignor to Reliance Hydraulic Press, Inc., New York, N. Y., a corporation of New York Application December 11, 1945, Serial No. 634,155

9 Claims. (Cl. 192—144)

This invention relates to flywheel type punch presses.

An object of this invention is a flywheel punch press which is reliable in operation, can be operated at high speed, is silent in operation, has a long, efficient life and is of simple construction.

In a flywheel punch press embodying this invention, hydraulic means are provided for clutching and declutching the flywheel and crank shaft and additional hydraulic means are provided for applying and releasing brake means for the crank shaft. Cams rotatable with the crank shaft actuate four-way fluid valves to control the flow of hydraulic fluid to and from both hydraulic means. By reason of this structure, the noisy clicking incidental to mechanical clutch and brake-operating means is avoided, thereby rendering silent the operation of the press. Means also are provided for preventing operation of the hydraulic means to clutch the flywheel and crank shaft except when the operator's both hands are in a position of safety. Also, the press frame is mounted on a base for limited tilting movement whereby the angularity of the frame may be varied.

Other objects, novel features and advantages of this invention will become apparent from the following specification and accompanying drawings, wherein:

Fig. 7 is a side elevation of Fig. 6;

A base 10 has a frame 11 pivotally connected thereto by means of a shaft 12. A hollow member 13 is pivotally supported at one end by the pin 14 mounted in the base 10 and in its free end the member 13 receives a rotatable member 15 having a plurality of radial recesses 16. The members 13 and 15 are provided with cooperating shoulders to limit movement of the member 15 toward the pivot pin 14 and the member 15 is provided with a peripheral groove 17 into which projects the inner end of a screw 18' mounted in the member 13 to prevent withdrawal of the member 15 from the member 13. The member 15 has a threaded bore in which is arranged a lag screw 18, the upper end of which has a transverse bore through which passes a pin 19, the ends of which are arranged in ears 20 formed on the frame 11. The shaft 12 is located near the front of the base and the lag screw 18, in combination with its associated parts, provides means for tilting the frame 11 at any desired angle upon rotation of the member 15 through the medium of a bar inserted in the recesses 16. The frame 11 carries a pin 21 projecting through an arcuate slot in the base 10 concentric with the pivot pin 12 and serves serves to limit the extent of tilting of the frame 11 as well as to indicate the extent of tilting by reason of indicia provided in suitable relationship to the slot 22 for that purpose.

A crank shaft 23 is journalled in the frame 11 and a pitman rod 24 is attached in the usual manner to the crank pin 25 of the crank shaft 23. The lower end of the pitman rod is attached in the usual manner to a head 26 slidably supported by vertical guides 27 for movement toward and away from the bed 28 in the usual manner. The frame 11 supports a motor 29 and an oil pump 30 which is driven by the motor through the medium of a belt 31.

A flywheel 32 is journalled on one end of the crank shaft 23 and is driven by the motor 29 through the medium of a belt 33. A thrust bearing 34 is interposed between one face of the flywheel 32 and a shoulder 35 on the crank shaft 23. A circular clutch element 36 is held against the outer face of the flywheel 32 by bolts 37 and is provided with an inner tapering surface 38. A hub 39 is supported by the crank shaft 23 and is keyed thereto by a spline 40 so that the hub and shaft rotate in unison and the hub is movable axially of the shaft. A circular clutch element 41 is attached to the hub 39 by bolts 42 and has an outer conical face 43 complementary to the face 38 of the clutch element 36. A strip 44 of standard clutch facing material is fixed to the clutch element 41 and is arranged between the surfaces 43 and 38.

The extreme end of the crank shaft 23 has a threaded portion 45 of reduced diameter and a circular piston 46 has an interiorly threaded bore co-operating with the threaded portion 45 to attach the piston to the end of the shaft. A block 47 has a cylindrical bore 47a of two different diameters with the smaller diameter portion receiving the crank shaft and the larger diameter portion receiving the piston 46. The block 47 is attached to the collar 39 by bolts 48. A head 49 fits the outer end of the block 47 and has an extension 50. A passageway 51 leads from the inner end of the cylinder to a radial port 52 in the extension 50 while a passageway 53 leads from the outer end of the cylinder through the extension to a radial port 54. The cylinder 47a and the piston 45 constitute a hydraulic motor for actuating the clutch element 41 by reciprocation of the block 47 on the crank shaft 23. A cap 55 is journalled on the extension 50 and has circular recesses 56 and 57 communicating respectively with the ports 52 and 54. Ports 58 and 59 in the sleeve communicate with the recesses 56 and 57 respectively.

A brake drum 60 is fixed to the remaining end of the crank shaft 23 by a key 61. A split brake band 62 is supported by the frame 11 through the medium of a post 63 and is provided with a suitable brake lining 63a. The two sections of the brake band are urged toward the drum 62 by a spring 64 arranged on a rod 65 extending through the free ends of both of the band sections and having nuts 66 and 67 at the opposite ends thereof with the spring 64 arranged between one band section and the nut 67 which is adjustable to vary the tension exerted by the spring 64. A roller 68 is carried by a yoke at the end of the piston 69 of a hydraulic motor 70. The roller 68 is adapted to be projected by the hydraulic motor between the ends of the brake sections for the purpose of stretching apart the band sections to release the crank shaft. Upon withdrawal of the roller 68, the spring 65 urges the band section into engagement with the brake drum 60 to oppose rotation of the shaft 23.

A sleeve 71 is keyed to the crank shaft 23 and is provided with a pair of cams 72 and 73 which have high sections 72a and 73a respectively and low sections 72b and 73b respectively. Cam followers 74 and 75 for co-operation with the peripheries of the cams 72 and 73 respectively are arranged at the ends of levers 76 and 77 respectively, fulcrumed on a common pivot pin 78. A pair of standard four-way fluid valves 79 and 80 are suitably arranged below the free ends of the levers 76 and 77 respectively for actuation thereby. The valves 79 and 80 have actuating plungers 79a and 80a respectively, as well as springs 79b and 80b respectively for normally maintaining the plunger in a predetermined adjustment. The plunger 79a and 80a are located respectively in the paths of the ends of the levers 76 and 77 opposite the cam followers 74 and 75. A rod 81 slidably carries a cross-bar 82 engaging the upper surface of the levers 76 and 77 on the opposite side of the pivot pin 78 from the cam followers. A spring 83 is interposed between the cross bar and a nut 84 on the end of the rod. The rod 81 is mounted in guides 85 and at its lower end is connected to the upper end of link 86, the lower end of which is connected to one arm of a bell crank lever 87, the other end of which is connected by a cable 88 passing over suitable guide rollers 89 and 90 to a foot pedal 91. The arrangement is such that upon depression of the pedal 91, the rod 81 is caused to move downwardly.

An oil supply pipe 92 leads from a pump 30 to the inlet port of the four-way valve 79 and a pipe 92a leads from the return port of said valve to a reservoir (not shown). A pipe 93 leads from the third port of the valve 91 to the port 58 of the cap 55 while a pipe 94 leads from the fourth port of the valve 79 to the port 59 of the cap 55. Similar connections 95, 95a, 96 and 97 are provided between the pump 30 and the four-way valve 80 and between said valve and the hydraulic motor 70.

Figure 4:
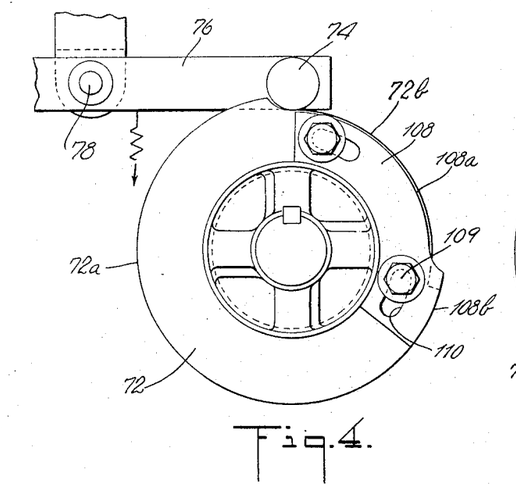
Fig. 4 is a fragmentary end view of Fig. 3.
Figure 5:
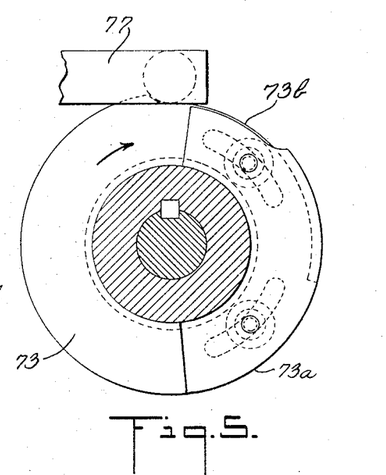
Fig. 5 is a section on the line 5—5 of Fig. 3.
Figure 6:
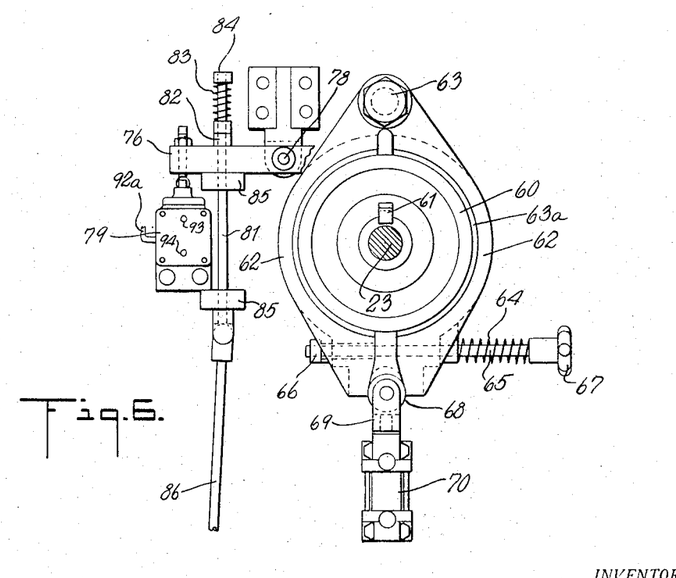
Fig. 6 is a section substantially on the line 6—6 of Fig. 3.
Figure 8:
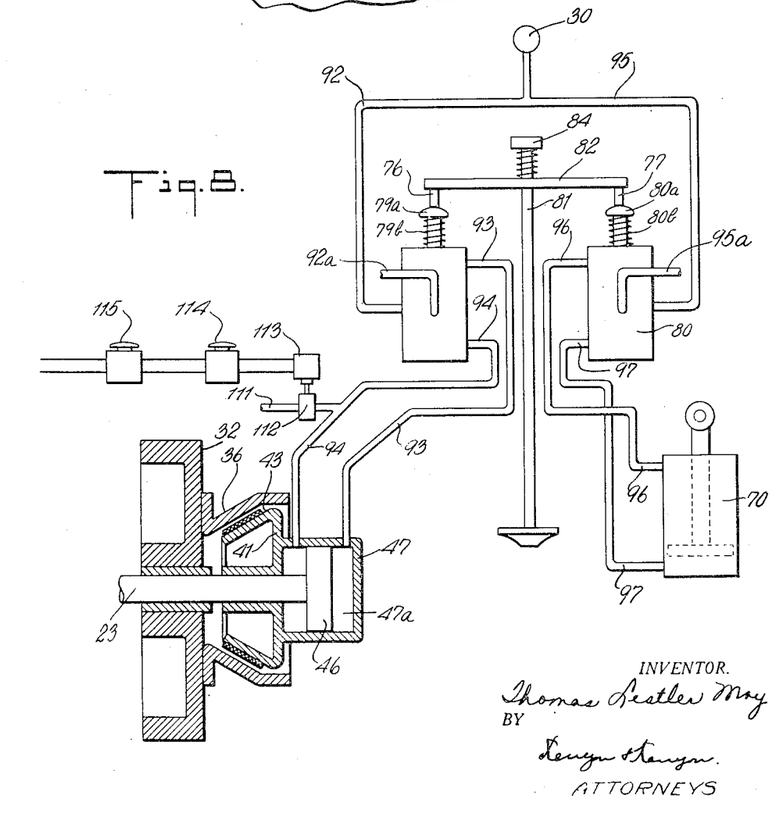
Fig. 8 is a hydraulic diagram.

The arrangement is such that with the clutch inoperative and the brake operative, the cam followers 74 and 75 contact the low sections 72b and 73b of the cams 72 and 73, as indicated in Figs. 4 and 5 near the trailing ends thereof. With the parts in the position shown in Figs. 4 and 5, the valve plungers 79a and 80a are in such position that hydraulic fluid is supplied under pressure to the upper end of the hydraulic motor 70 to locate the roller 68 out of engagement with the brake sections to permit the spring 64 to hold the brake sections against the drum 60 to oppose rotation of the crank shaft and hydraulic fluid is supplied under pressure to the outer ends of the cylinder 47a to hold it and the drum 41 with the clutch facing 46 out of engagement with the member 36 so that the flywheel 32 rotates freely on the shaft 23. The pedal 91 is in its uppermost position to which position it is biased by the springs 79b and 80b. Upon depression of the pedal 91, the levers 76 and 77 are tilted to lift the cam followers 74 and 75 and to depress both valve plungers 79a and 80a whereupon the supply of hydraulic fluid to the motor 70 is reversed to force the roller 68 between the ends of the brake sections to release the crank shaft 23 for rotation. Also, the supply of hydraulic fluid to the cylinder 47 is reversed to apply pressure urging the cylinder 47 in the direction to engage the clutch facing 44 with the surface 38 to clutch the flywheel to the crank shaft to cause rotation of the latter. The cams 72 and 73 rotate counter-clockwise from the position shown in Fig. 4 to locate the high sections 72a and 73a under the cam followers to hold the levers 76 and 77 tilted after the release of the pedal 91. After predetermined extent of rotation of the crank shaft, the cam followers ride off the high sections 72a and 73a into contact with the low sections 72b and 73b thereby permitting return of the four-way valves 79 and 80 to their original positions under the influence of their springs and corresponding return of the levers 76 and 79 to original position. The extent of the high section 73a is greater than the extent of the high section 72a so that the clutch is released before the brake is actuated. The hydraulic motor 70 is thereupon actuated to withdraw the roller 68 from between the ends of the brake band sections and also the clutch hydraulic motor is actuated to disengage the clutch facing 44 from the surface 38 thereby stopping the crank shaft after one complete revolution.

Declutching of the flywheel from the crank shaft is facilitated by springs 97 seated in sockets in the hub 39 and bearing against a collar 98 attached to the crank shaft 23 and engaging the flywheel 32. A suitable packing 99 provides a fluid-tight seal between the crank shaft 23 and the block 47. The end of the cap 55 is formed as a detachable cover 100 and a plate 101 attached to the end of the shaft 23 by bolts 102 holds the cap in position on the shaft against a shoulder 103. At each end of the cap 55 there is provided a circular chamber 104 connecting with a longitudinal chamber 105 arranged below the extension 50. The cover 100 closes one chamber 104 while a sealing member 106 closes the other. Any hydraulic fluid which escapes along the surface of the extension 50 from the grooves 52 and 54 is conducted by the chambers 104 to the chamber 105 from which it is returned through the pipe 107 to the reservoir of the hydraulic system.

Each of the cams 72 and 73 is so constructed as to permit change of the effective length of the high and low sections 72a and 73a respectively. This construction will be described only in connection with cam 72 but it is to be understood that the cam 73 is of the same construction. The cam 72 is provided with a low section 72a of definite length and the cam supports an arcuate member 108 by studs 109 passing through arcuate slots 110 in the cam 52 coaxial therewith. The member 108 is provided with high and low sections 108a and 108b corresponding to the high and low sections 72b and 73b. By rotatable adjustment of the member 108 the effective lengths of the high and low sections of the cam may be varied within limits thereby varying the timing of the valve 79.

Figure 1:
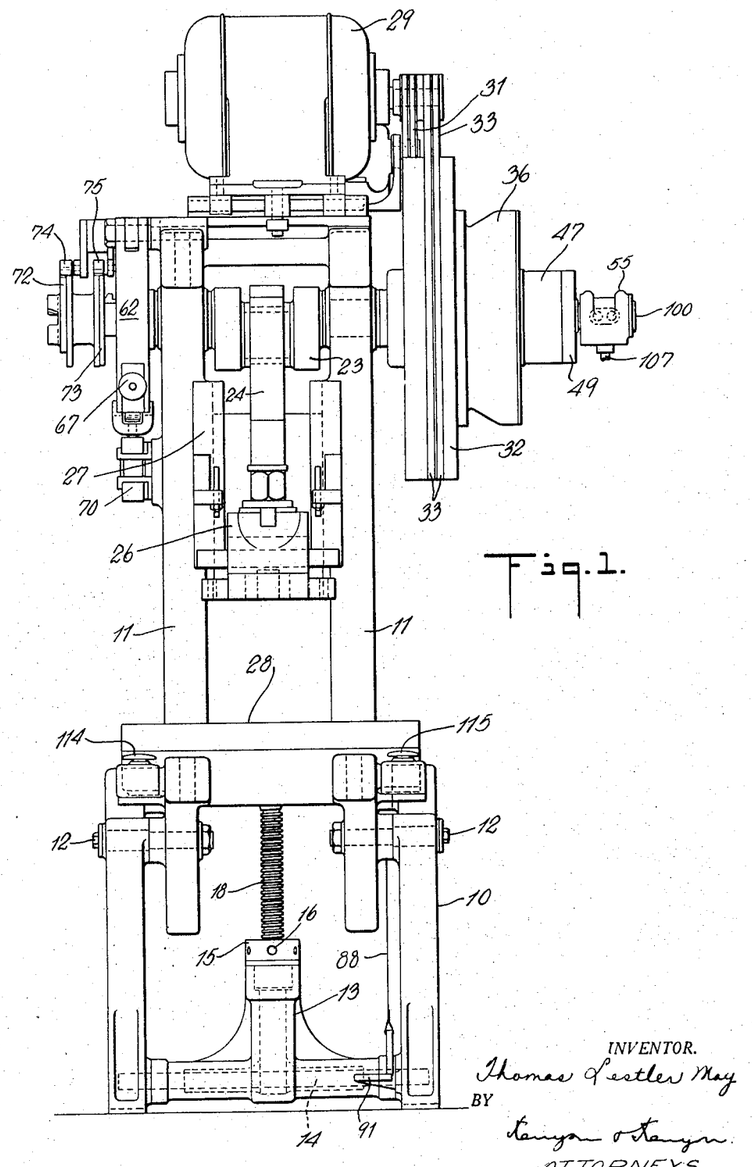
Fig. 1 is a front elevation of a press constructed in accordance with the invention.
Figure 2:
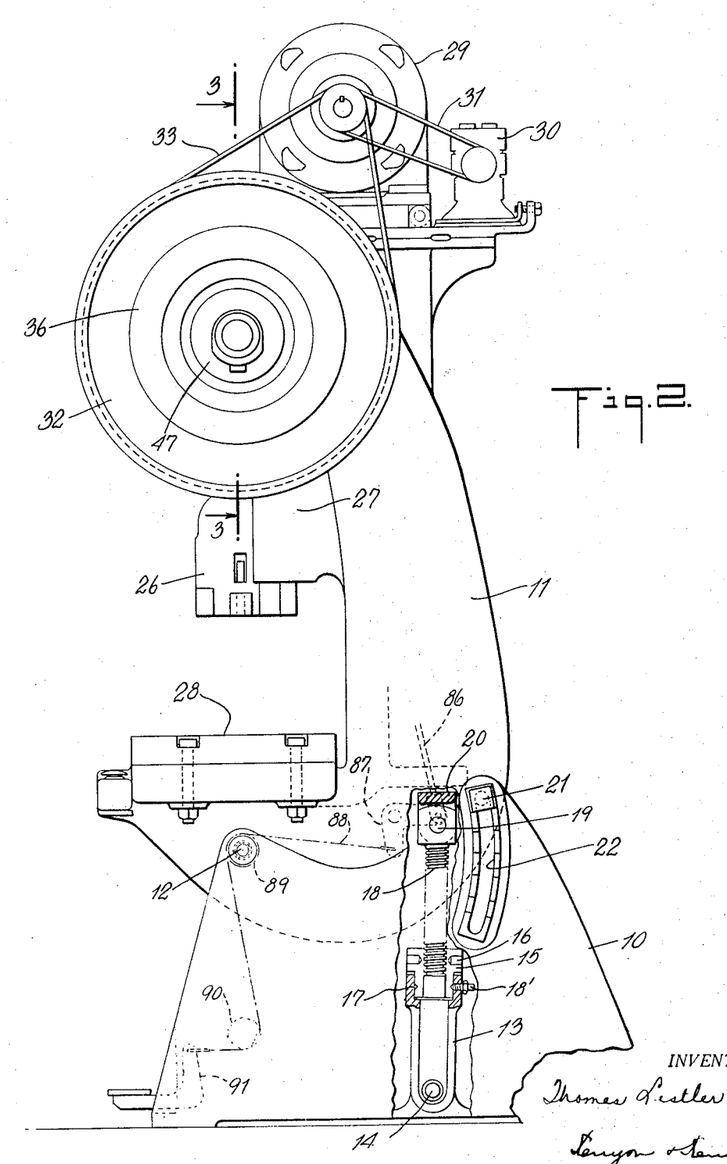
Fig. 2 is a side elevation.
Figure 3:
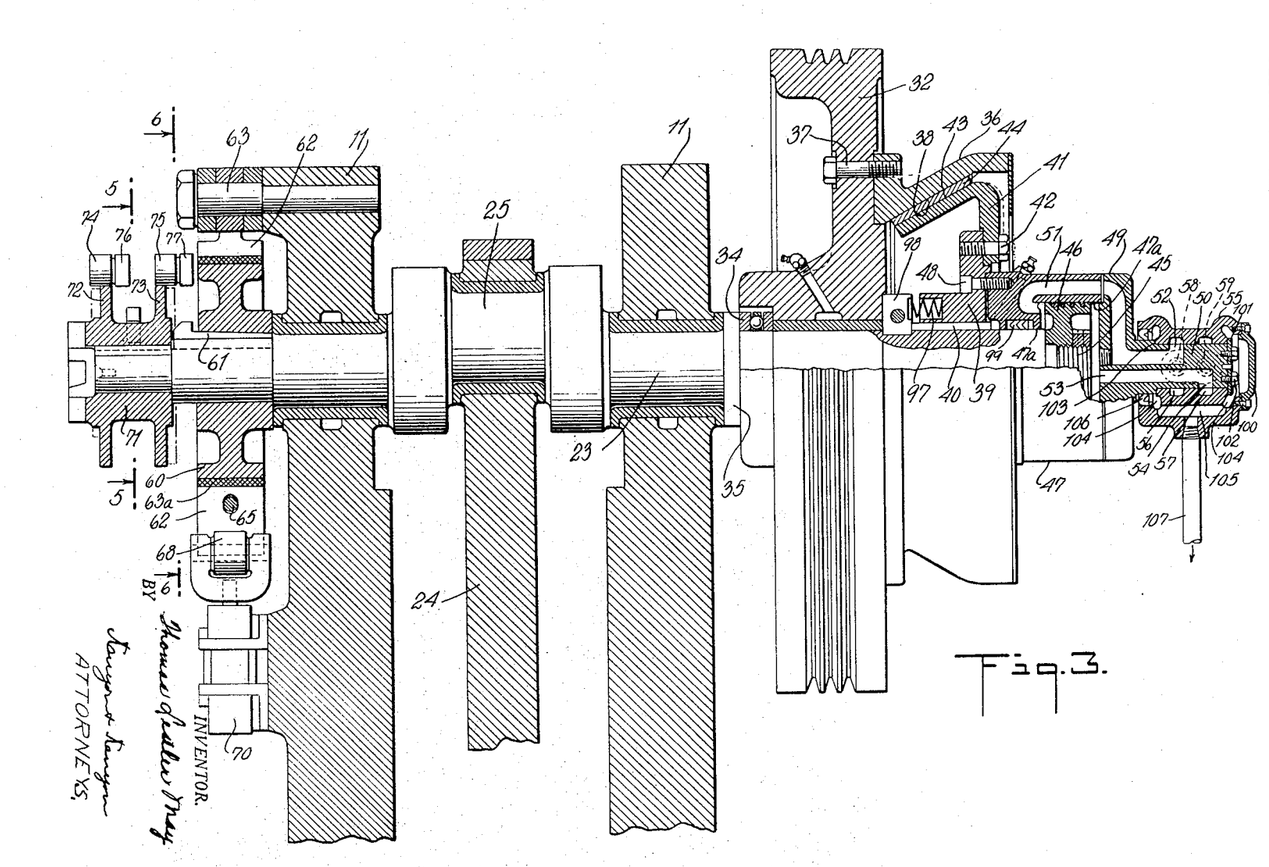
Fig. 3 is a section on the line 3—3 of Fig. 2.

The press is equipped with mechanism to prevent operation of it except when the operator's hands are both in positions of safety. A bleed 111 leads from the pipe 94 through which the hydraulic fluid is supplied to the clutch-operating hydraulic motor for the purpose of clutching the shaft 23 to the flywheel 32. The bleed 111 is controlled by a valve 112 operated by a solenoid 113, the arrangement being such that with the solenoid deenergized, the valve is opened allowing hydraulic fluid to pass through the bleed from the pipe 94 to a reservoir (not shown). The energizing circuit for the solenoid includes a pair of palm switches 114 and 115 arranged in front of the press bed 28 (Fig. 1). These switches are self-opening and are closed by downward pressure of the operator's hands and both switches must be closed in order to energize the solenoid 113. Should the pedal 91 be tripped with either switch 114 and 115 open, the pressure of the hydraulic fluid supplied to the clutch-operating motor will be insufficient to energize it because of the fact that the bleed 111 is open and hydraulic fluid is by-passed therethrough to the reservoir. In order to clutch the flywheel 32 to the shaft 23, both switches 114 and 115 must be closed and the pedal 91 depressed.

Figure 9:
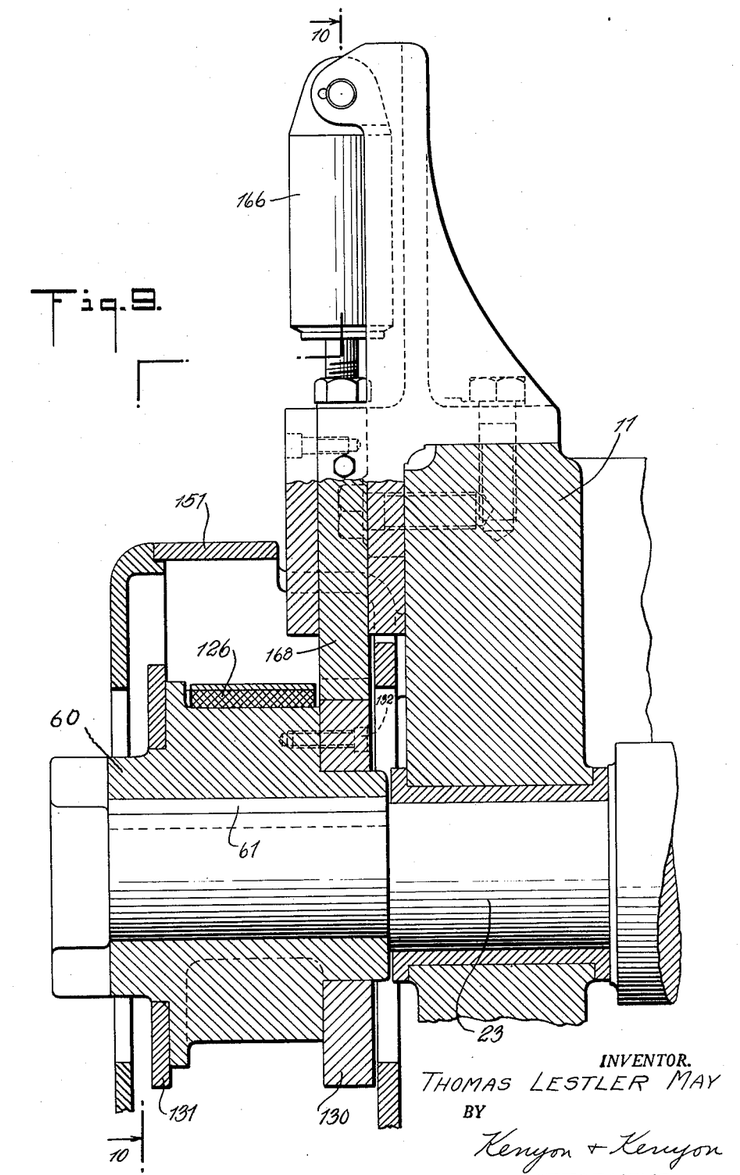
Fig. 9 is a fragmentary section generally similar to Fig. 3 of a modified embodiment of the invention.
Figure 10:
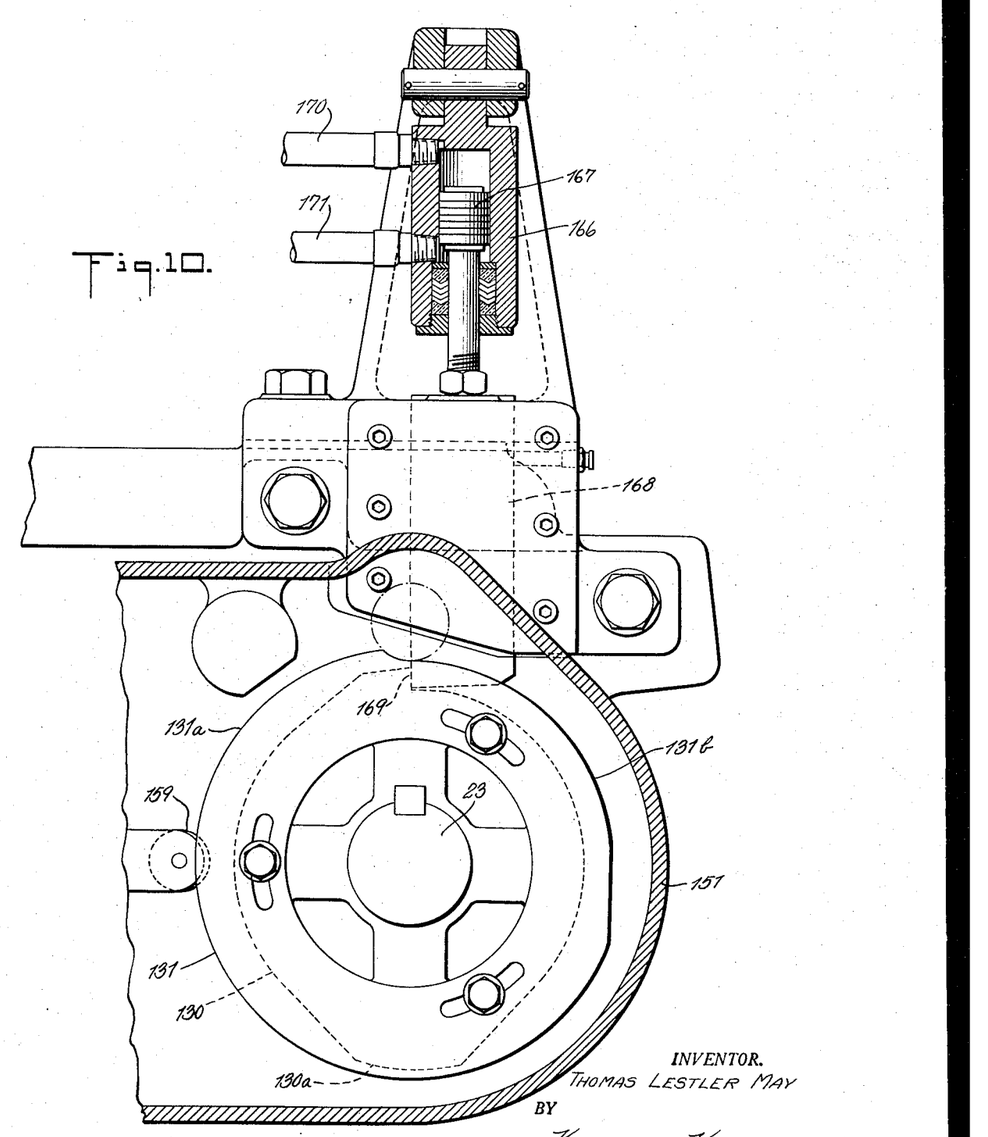
Fig. 10 is a section on the line 10—10 of Fig. 9.
Figure 11:
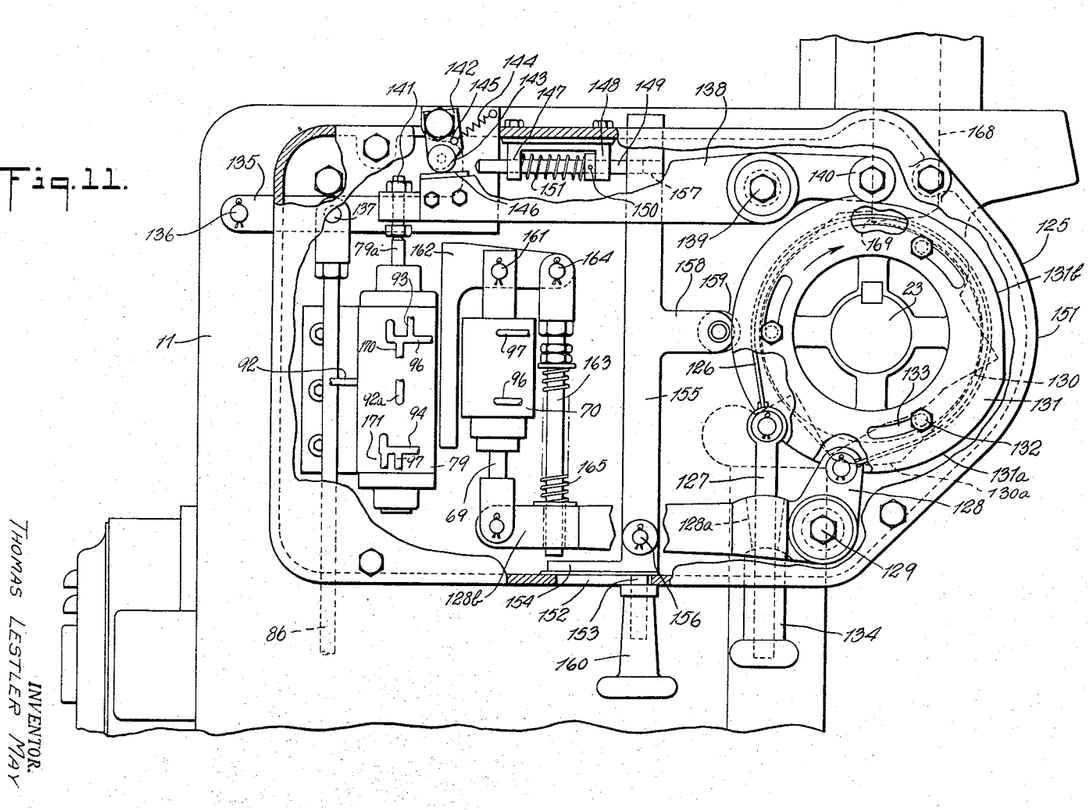
Fig. 11 is an elevation partially broken away of Fig. 9.

In Figs. 9 to 11 inclusive, the frame 11 supports a casing 125 having an aperture through which the shaft 23 extends. The brake drum 60 is enclosed by a brake band 126, one end of which is attached to one end of a rod 127 and the other end of which is attached to the short arm of a bell crank lever 128 supported by a pivot pin 129. The brake drum 60 supports two cams 130 and 131 which are adjustably mounted on the brake drum 60 by bolts 132 extending through arcuate slots 133. The end of the long arm of the bell crank lever 128 is pivotally connected to the piston 69 of the hydraulic motor 70. The rod 127 passes through an eye 128a in the long arm of the bell crank lever 128 and has its remaining end threaded to receive a sleeve 134 engaging said bell crank lever arm to cause downward movement of the rod 127 upon counterclockwise rotation of the bell crank lever 128.

The four-way valve 79 controls the flow of hydraulic fluid to and from the brake motor 70 as well as the clutch motor and the valve 80 is dispensed with. The pipe 92 supplies hydraulic fluid to the valve 79 from the pump 30 and hydraulic fluid is discharged from the valve 79 through the pipe 92a to the reservoir. The pipes 93 and 96 communicate with one port of the valve 79 while the pipes 94 and 97 communicate with a second port of the valve 79.

An arm 135 is pivotally supported from the frame 11 by the pin 136 and is attached to the link 86 by a pin 137. Downward movement of the link 86 by operation of the treadle 91 causes clockwise rotation of the arm 135. A rocker 138 is supported from the frame 11 by a pivot pin 139 and at its right end is provided with a roller 140 for engagement with the cam 131. At its left end, the rocker 138 carries an adjustable bolt 141 for engagement with the plunger 79a of the four-way valve 79. Counterclockwise rotation of the rocker 138 causes downward movement of the plunger 79a of the valve 79 against the action of its spring 79b.

The free end of the arm 135 pivotally supports an arm or bar 142 carrying a roller 143 and a spring 144 biases the arm 142 counterclockwise against a stop illustrated as being a pin 145 carried by the arm 135. The roller 143 engages a plate 146 carried by the rocker 138 at its left end. The arrangement is such that with the arm 142 engaging the pin 145 counterclockwise rotation of the lever 135 urges the lever 142 counter-clockwise against the stop.

The casing 125 supports a bracket having a pair of spaced arms 147 and 148 in which is slidably mounted a plunger 149 in alinement with the arm 142. Between a collar 150 on the plunger 149 and the arm 147 is provided an expansion spring 151 tending to maintain the collar 150 against the arm 148. The housing 125 has a slot 152 through which extends a stud 153 projecting from a slide 154 engaging the inner surface of the housing. A vertical arm 155 is pivotally attached at its lower end to the slide 154 by a pin 156. In the upper end of the arm 155 is a recess 157 receiving the right end of the plunger 149. An extension 158 from the arm 155 carries a cam follower 159 adapted for engagement with the cam 130. A hand-operable nut 160 is threaded onto the stud 153 for tightening against the outer surface of the casing 125 to maintain the slide 154 in any desired position along the slot 152.

The hydraulic motor 70 is pivotally suspended at its upper end from a pin 161 carried by a bracket 162 forming part of the frame 11. A threaded rod 163 is supported at one end by a pin 164 also carried by the bracket 162. The rod 163 projects through an eyelet 128b in the longer arm of the bell crank lever 128. A spring 165 carried by the rod 163 biases the bell crank lever 128 counterclockwise and serves to apply the brake in the event of failure of hydraulic pressure.

The frame 11 supports a double-acting hydraulic motor 166, the piston 167 of which is attached to a slide 168 supported in alinement with the cam 130 which is provided with a radial shoulder 169 for engagement with the slide 168 in one position thereof. The upper end of the hydraulic motor 166 is connected by the pipe 170 through the same port of the four-way valve 79 as the pipe 93 while the lower end of the hydraulic motor 166 is connected through the pipe 171 with the same port of the valve 79 as the pipe 94. With the piston 167 in its lower position, the slide 168 extends into the path of the shoulder 169 while with the piston 167 in its upper position the slide is out of the path of the shoulder 169.

The cam 131 has a high section 131a and a low section 131b which co-operate with the cam follower 140 in the same manner as the sections 72a and 72b of the cam 72 co-operate with the cam follower 74 of the embodiment of Figs. 1 to 8 inclusive. The cam 130 has a short section 130a of greater radius than the remainder, which section is approximately opposite the shoulder 169 and is adapted to engage the roller 159 in one setting of the slide 154. With the shaft 23 at rest, the follower 140 contacts the low cam section 131b near the trailing end thereof and the section 130a is oriented from the roller 159 approximately 90°.

The apparatus just described may be arranged to operate continuously as long as the pedal 91 is actuated or to stop at the end of one complete rotation of the shaft 23 irrespective of whether or not the pedal is released. The single rotation operation will be first described. With the pedal 91 released, the plunger 79a of the four-way valve 79 is in its uppermost position and the valve 79 is so set that hydraulic fluid is supplied to the clutch motor to release the shaft 23 from the flywheel 32 and that hydraulic fluid is supplied to the motor 70 to maintain the plunger 69 in its lowermost position with the brake applied and that hydraulic fluid is supplied to the motor 166 to locate the slide 168 in the path of the shoulder 169. The cam follower 140 contacts the low section 131b of the cam 131 near the trailing end thereof and the rocker 138 is in its extreme clockwise position. The slide 154 is at its extreme right position with the follower 159 in position to be engaged by the section 130a of the cam 130.

Upon operation of the treadle 91, the link 86 moves downwardly to rotate the arm 135 clockwise and through the intermediary of the arm 142, roller 143 and plate 146 rotates the rocker 138 counter-clockwise to depress the plunger 79a and change the setting of the valve 79 and lift the follower 140 away from the low cam section 131a. With the new setting of the valve 79, the flow of hydraulic fluid to the clutch, brake and latch motors is reversed so that the brake is released, the clutch is actuated and the slide 168 is lifted out of the path of the shoulder 169. Initial rotation of the shaft 23 locates the high portion 131a of the cam 131 under the follower 140 to prevent clockwise rotation of the rocker 138 and maintain engagement of the roller 143 with the plate 146. Continued rotation of the shaft 23 brings the high spot 130a of the cam 130 into engagement with the roller 159, thereby causing counter-clockwise rotation of the arm 155 and movement of the plunger 148 to the left to swing the arm 142 past its dead-center position, thereby freeing the rocker 138 for clockwise movement under the influence of the return spring 79b for the plunger 79a. Upon further rotation of the shaft 23, the high section 131a moves out of engagement with the follower 140, thereby permitting return of the rocker 138 as well as the valve plunger 79a to original position. Upon return of the valve 79 to its original setting, the clutch is released, the brake applied and the slide 167 projected into the path of the shoulder 168. After release of the treadle 91, the arm 135 rotates counterclockwise to its original position, thereby permitting return of the arm 142 to the position shown in Fig. 12 under the influence of the spring 144.

For continuous operation, the slide 154 is moved to the left a sufficient distance that the roller 159 is not engageable by the high section 130a of the cam 130. The plunger 148, therefore, is not operated and the arm 142 remains in position to keep the rocker 138 fully rotated counter-clockwise and the plunger 79a in its lowermost position until such time as the lever 135 is returned to its original position by release of the treadle 91.

Figure 12:
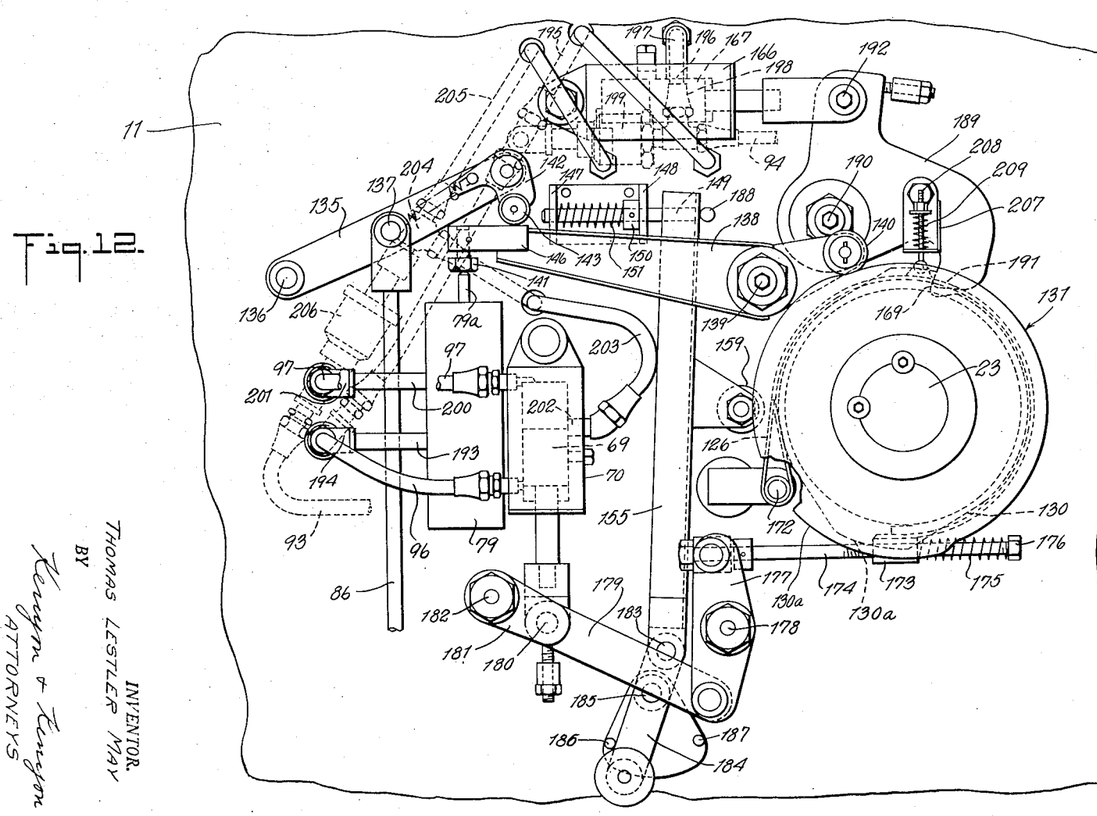
Fig. 12 is an elevation generally similar to Fig. 11 of a further modification.
Figure 13:
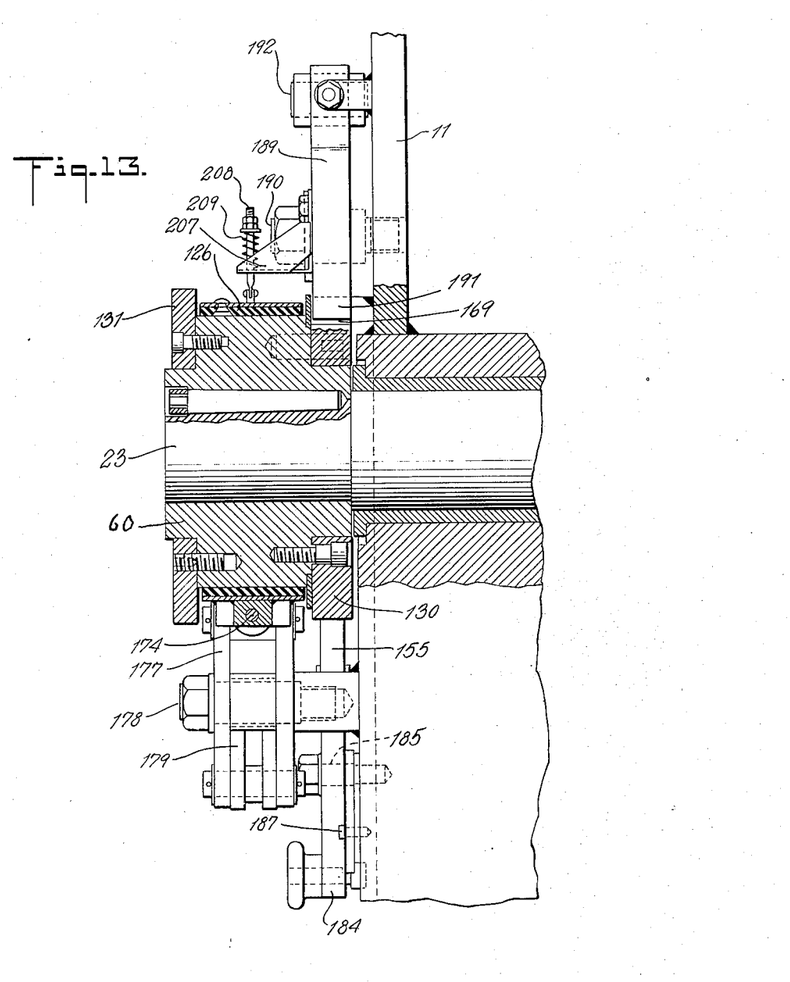
Fig. 13 is a section on the line 13—13 of Fig. 12.

The modification of Figs. 12 and 13 is fundamentally similar to that of Figs. 9 to 12 inclusive but differs in respect of certain structural details which will hereinafter be described.

The brake band 126 is attached at one end to a fixed pin 172 and is provided at its opposite end with a sleeve 173 in which is slidably mounted a rod 174. A spring 175 is interposed between the sleeve 173 and a nut 176 on the rod 174 to the right of the sleeve. The left end of the rod 174 is pivotally connected to one extremity of a lever 177 pivotally supported on a pin 178. A link 179 is pivotally connected at one end to the remaining end of the lever 177 and its other end is pivotally connected to the piston 69 of the hydraulic motor 70 by a pin 180. An arm 181 is pivotally supported at one end by a fixed pin 182 and its remaining end is pivotally connected to the piston 69 by the pin 180. The arm 181 and link 179 constitute a toggle which, when in the straight position, as shown in Fig. 12, clamps the brake band 125 around the brake drum 60 with the piston 69 in its lowermost position. Upward movement of the piston 69 breaks the toggle and effects clockwise movement of the lever 177 to move the rod 174 to the right, thereby releasing the brake.

The arm 155 is pivotally connected at its lower end by a pin 183 to one end of a lever 184 pivoted on the pin 185. Stop pins 186 and 187 limit the swinging movement of the lever 184. With the lever 184 engaging the pin 186, the arm 155 is in position to have the cam follower 159 engaged by the high spot 130a of the cam 130 while with the lever 184 engaging the stop 187, the arm 155 is in such position that the roller 159 is out of the path of the high spot 130a. A pin 188 engages the right side of the arm 155 near its upper end to retain it in proper position.

A bell crank lever 189 is pivotally supported on the pin 190 and one arm of the bell crank lever has a portion 191 adapted for movement into the path of the shoulder 169. The remaining arm of the bell crank lever is pivotally connected by a pin 192 to the piston 167 of the hydraulic motor 166. With the piston 167 in its extreme right position, the portion 191 is in the path of the shoulder 169 while in the extreme left position of the piston 167 the part 191 is out of the path of the shoulder 169.

A pipe 193 leads from one port of the four-way valve 79 to a T 194 from which the pipe 96 leads to the lower end of the motor 70 and the pipe 195 leads to the right end of the motor 166. A port 196 in the motor 166 is connected through pipe 197 to a T 198, one arm of which connects to the pipe 94 leading to the clutch motor. The other arm of the T 198 communicates with the inlet of a check valve 199, the outlet of which communicates with the pipe 195. The remaining port of the valve 79 communicates through a pipe 200 with a T 201, one arm of which communicates with the upper end of the motor 70 through the pipe 97 and the other arm communicates through the pipe 93 with the left end of the clutch motor. The motor 70 has a port 202 which communicates with a pipe 203 leading to a T 204, one arm of which communicates through the pipe 205 with the left end of the motor 166. The remaining arm of the T 204 communicates with the inlet of a check valve 206, the outlet of which communicates with said T 201. The port 196 is so arranged in the motor 166 that it is covered by the piston 167 except when the piston is at the left end of its path. The port 202 in the motor 70 is so arranged that it is covered by the piston 69 except when the piston is at the lower end of its stroke.

With the elements in the position shown in Fig. 12, the valve 79 is so set that hydraulic fluid pressure is applied to the upper end of the motor 70 and to the left end of the motor 166 and to the right end of the clutch motor so that the clutch is out, the latch is in and the brake is on. Upon operation of the treadle 91, the setting of the valve 79 is reversed whereupon hydraulic fluid flows through the pipe 96 into the bottom of the motor 70 to lift the piston 69 and release the brake and through the pipe 195 into the right end of the motor 166 to move the piston 167 to the left, thereby releasing the latch 191. After the latch has been released, hydraulic fluid flows from the motor 166 through the pipe 197 and pipe 94 to the left end of the clutch motor to throw in the clutch. Hydraulic fluid flows from the right end of the clutch motor through the pipe 93 to the valve 79, from the cylinder 70 through the pipes 97 and 200 to the valve 79 and from the motor 166 through the pipe 205 and check valve 206, to the valve 79. After a single rotation of the shaft 23, the valve 79 is returned to its original position by operation of the arm 155, plunger 148 and arm 142 as described in connection with the previous modification. Hydraulic fluid then flows from the valve 79 through the pipes 200 and 97 to the upper end of the motor 70 to force the motor piston downward into brake-applying position. When the motor piston reaches such position, hydraulic fluid then flows through the pipe 203 to the elbow 204 and through the pipe 205 to the left end of the motor 166. Hydraulic fluid also flows through pipe 93 to the right end of the clutch motor. Hydraulic fluid flows from the bottom of the motor 70 through the pipes 96 and 193 to the valve 79, from the right end of the motor 166 through the pipe 195 to the valve 79 and from the right end clutch motor through the pipe 93, the check valve 199 and pipe 195 to the valve 79. The check valve 199 provides a bypass for hydraulic fluid from the clutch motor around the motor 166 in its flow to the valve 79 during the release of the clutch. The check valve 206 provides a by-pass around the motor 70 for hydraulic fluid flowing from the motor 166 to the valve 79 when the piston of the motor 70 is in its brake-released position.

A bracket 207 is pivotally supported by the bell crank lever 189 and has an aperture through which slidably extends a rod 208, one end of which is pivotally connected to the brake band 126. At the other end of the rod 208 is provided an adjustable abutment between which and a portion of the bracket is arranged an expansion spring 209 surroundig the rod 208. Upon release of the brake mechanism and disengagement of the bell crank lever from the shoulder 169, the spring 209 tends to lift the brake band 126 away from the brake drum 60.

It is to be understood that various modifications may be made in the device above described without in any way departing from the spirit of the invention as defined in the appended claims.

This application is a continuation-in-part of applicant's co-pending application, Serial No. 570,621, filed December 30, 1944, now Patent Number 2,493,495, issued January 3, 1950.

I claim:

1. In a punch press having a crankshaft, a pivoted arm, a manually actuated pivoted rocker, interengaging means on said arm and rocker for effecting rotation of said rocker upon rotation of said arm, a rotatable cam connected with said crankshaft, and means actuated by said cam for rendering inoperative said interengaging means to permit limited rotation of said rocker independent of said arm.

2. In a punch press, a pivoted arm, a pivoted rocker, interengaging means on said arm and rocker for effecting rotation of said rocker upon rotation of said arm, a rotatable cam, an adjustably supported cam follower, and means actuated by said cam follower for rendering inoperative said interengaging means to permit limited rotation of said rocker independent of said arm.

3. A punch press comprising a rotatable crank shaft, a hydraulic system including a valve for controlling rotation of said crank shaft, means including a rocker for actuating said valve, a pivoted arm, interengaging means on said arm and rocker for effecting rotation of said rocker upon rotation of said arm, a cam rotatable with said shaft, and means actuated by said cam for rendering inoperative said interengaging means to permit limited rotation of said rocker independent of said arm.

4. A punch press comprising a rotatable crank shaft, a hydraulic system including a valve for controlling rotation of said crank shaft, means including a rocker for actuating said valve, a pivoted arm, interengaging means on said arm and rocker for effecting rotation of said rocker upon rotation of said arm, a cam rotatable with said shaft, an adjustably supported cam follower, and means actuated by said cam follower for rendering inoperative said interengaging means to permit limited rotation of said rocker independent of said arm.

5. A punch press comprising a rotatable crank shaft, a hydraulic system including a valve for controlling rotation of said shaft, means including a rocker arm for actuating said valve, a pivoted arm, means including a pivoted element supported by one arm for engagement with the other arm to effect rotation of said rocker arm upon rotation of said one arm, a cam rotatable with said shaft, and means actuated by said cam for swinging said element into position to permit limited rotation of said rocker independent of said arm.

6. A punch press comprising a rotatable crank shaft, a hydraulic system including a valve for controlling rotation of said shaft, means including a rocker arm for actuating said valve, a pivoted arm, means including a pivoted element supported by one arm for engagement with the other arm to effect rotation of said rocker arm upon rotation of said one arm, a cam rotatable with said shaft, an adjustably supported cam follower, and means actuated by said cam follower for swinging said element into a position to permit limited rotation of said rocker independent of said arm.

7. A punch press comprising a rotatable crank shaft, a hydraulic system including a valve for controlling rotation of said crank shaft, means including a rocker for actuating said valve, a pivoted arm, a bar pivoted at one end to said arm and having its other end engageable with one end of said rocker, a stop engageable by said bar in position to effect rotation of said rocker upon rotation of said arm, resilient means biasing said bar toward said stop, a plunger adapted to engage said bar to move it away from said stop, means biasing said plunger away from said bar, a cam rotatable with said crank shaft, and a movable member engaging said plunger, said cam having a raised portion engageable with said member to effect movement of said plunger into engagement with said bar to swing the latter into position to release said rocker.

8. A flywheel press including in combination a flywheel, a crankshaft, a clutch constructed and arranged to rotatively interconnect said flywheel and said crankshaft when said clutch is engaged, a reciprocative controller constructed and arranged to disengage said clutch when moved to a first position and to engage said clutch when moved to a second position, rotory cam means connected with said crankshaft to rotate therewith, a reciprocative cam follower connected with said controller to reciprocate the latter, said cam means having a rotary cam surface engaged by said follower with said surface having a low portion moving said follower to a first position moving said controller to said first position and a high portion moving said follower to a second position moving said controller to said second position and said follower being free to move away from said low portion to said second position and being biased to move towards said low portion, a manually controlled reciprocating operator moving between first and second positions, latch means constructed and arranged to latch said operator in connection with said follower when said operator and said follower are respectively at their said first positions and to remain latched during their movement respectively to their said second position and when released to relatch only when said operator and said follower are respectively at their said first positions, a reciprocative latch release engaging and releasing said latch when said release is moved in one direction, and a second reciprocating cam follower connected with said latch release to move it in said direction, said cam means including a rotary riser engaged by said second follower after said cam means starts to be rotated by said crankshaft when said manually controlled operator is initially moved from its said first position to its said second position.

9. A flywheel press including in combination a flwheel, a crankshaft, a clutch constructed and arranged to rotatively interconnect said flywheel and said crankshaft when said clutch is engaged, a reciprocative controller constructed and arranged to disengage said clutch when moved to a first position and to engage said clutch when moved to a second position, rotory cam means connected with said crankshaft to rotate therewith, a reciprocative cam follower connected with said controller to reciprocate the latter, said cam means having a rotary cam surface engaged by said follower with said surface having a low portion moving said follower to a first position moving said controller to said first position and a high portion moving said follower to a second position moving said controller to said second position and said follower being free to move away from said low portion to said second position and being biased to move towards said low portion, a manually controlled reciprocating operator moving between first and second positions, latch means constructed and arranged to latch said operator in connection with said follower when said operator and said follower are respectively at their said first positions and to remain latched during their movement respectively to their said second position and when released to relatch only when said operator and said follower are respectively at their said first positions, a reciprocative latch release engaging and releasing said latch when said release is moved in one direction, and a second reciprocating cam follower connected with said latch release to move it in said direction, said cam means including a rotary riser engaged by said second follower after said cam means starts to be rotated by said crankshaft when said manually controlled operator is initially moved from its said first position to its said second position, said second follower being mounted for movement between a first position where it is engaged by said riser and a second position where it is freed therefrom and rendered inoperative.

THOMAS LESTLER MAY.

REFERENCES CITED

The following references are of record in the file of this patent:

UNITED STATES PATENTS

| Number | Name | Date |
| --- | --- | --- |
| 158,496 | Jackson | Jan. 5, 1875 |
| 304,479 | Weston | Sept. 2, 1884 |
| 615,441 | Emmerich et al. | Dec. 6, 1898 |
| 975,589 | Watkins | Nov. 15, 1910 |
| 1,520,733 | Turney | Dec. 30, 1924 |
| 1,544,766 | Leschhorn | July 7, 1925 |
| 1,547,355 | Bayer et al. | July 28, 1925 |
| 1,612,239 | Turney | Dec. 28, 1926 |
| 1,819,641 | Davis | Aug. 18, 1931 |
| 1,863,425 | Wallbillich et al. | June 14, 1932 |
| 1,869,085 | Williamson | July 26, 1932 |
| 1,894,434 | Williamson | Jan. 17, 1933 |
| 2,068,062 | Metten | Jan. 19, 1937 |
| 2,085,040 | Post | June 29, 1937 |
| 2,120,798 | Criley | June 14, 1938 |
| 2,192,734 | Clouse | Mar. 5, 1940 |
| 2,193,880 | Peet | Mar. 19, 1940 |
| 2,250,629 | Freidman | July 29, 1941 |
| 2,295,161 | Clay | Sept. 8, 1942 |
| 2,308,679 | Eason | Jan. 19, 1943 |
| 2,357,779 | Criley | Sept. 5, 1944 |
| 2,452,775 | Lindsley | Nov. 2, 1948 |
| 2,493,495 | May | Jan. 3, 1950 |

Certificate of Correction

Patent No. 2,559,195                                                                July 3, 1951

THOMAS LESTLER MAY

It is hereby certified that error appears in the printed specification of the above numbered patent requiring correction as follows:

Column 1, line 19, after "press" insert a period; column 2, line 22, strike out "serves", second occurrence; column 3, line 20, for the indistinct numeral after "and", second occurrence, read *59*; line 41, for "section" read *sections*; column 4, line 24, for "ends" read *end*; column 5, line 36, for "deenergized" read *de-energized*; column 11, line 23, for "rotory" read *rotary*; column 12, following line 46, list of references cited, insert the following:

978,776      Morgan ________________________ Dec. 13, 1910 and that the said Letters Patent should be read as corrected above, so that the same may conform to the record of the case in the Patent Office.

Signed and sealed this 25th day of September, A. D. 1951.

[SEAL]

THOMAS F. MURPHY,
*Assistant Commissioner of Patents.*